United States Patent [19]

Berger et al.

[11] 4,263,247
[45] Apr. 21, 1981

[54] RESIN-FOAM LAMINATE

[75] Inventors: Joseph C. Berger, West Chicago; James E. Fitzpatrick, Naperville; James P. Whelan, West Chicago, all of Ill.

[73] Assignee: Standard Oil Company (Indiana), Chicago, Ill.

[21] Appl. No.: 749,790

[22] Filed: Dec. 13, 1976

Related U.S. Application Data

[62] Division of Ser. No. 544,918, Jan. 28, 1975, abandoned.

[51] Int. Cl.³ ............................................... B29F 1/10
[52] U.S. Cl. .................................. 264/273; 264/275; 264/328.1
[58] Field of Search ............... 264/275, 273, 274, 328, 264/DIG. 48

[56] References Cited

U.S. PATENT DOCUMENTS

| | | | |
|---|---|---|---|
| 3,074,112 | 1/1963 | Bobrow | 264/275 |
| 3,096,146 | 7/1963 | Coale | 264/275 |
| 3,247,550 | 4/1966 | Haines, Jr. | 264/275 |
| 3,273,327 | 9/1966 | Hoffman | 264/DIG. 48 |
| 3,549,477 | 12/1970 | Burgman | 264/275 |
| 3,616,020 | 10/1971 | Whelan et al. | 156/244 |
| 3,741,844 | 6/1973 | Schwartz | 156/244 |
| 3,807,146 | 4/1974 | Witkowski | 264/274 |
| 3,954,537 | 5/1976 | Alfter et al. | 264/DIG. 83 |
| 3,954,926 | 5/1976 | Pahl et al. | 264/DIG. 83 |
| 3,971,837 | 7/1976 | Hasegawa et al. | 264/274 |
| 3,991,146 | 11/1976 | Barrie | 264/275 |

FOREIGN PATENT DOCUMENTS

| | | | |
|---|---|---|---|
| 1112253 | 8/1961 | Fed. Rep. of Germany | 264/317 |
| 279028 | 11/1970 | U.S.S.R. | 264/273 |

Primary Examiner—William R. Dixon, Jr.
Attorney, Agent, or Firm—David E. Boone; William T. McClain; William H. Magidson

[57] ABSTRACT

Laminates of resinous polymers of olefins and elastomeric, open celled polyester urethane foams and method and apparatus of their production. Examples of resinous polymers include polyethylene, copolymers of ethylene and propylene, polypropylene, polystyrene and impact polystyrene. Optionally, the foam can be provided with a plasticized vinyl or fabric layer, opposite the surface to which the polyolefin is applied.

5 Claims, 10 Drawing Figures

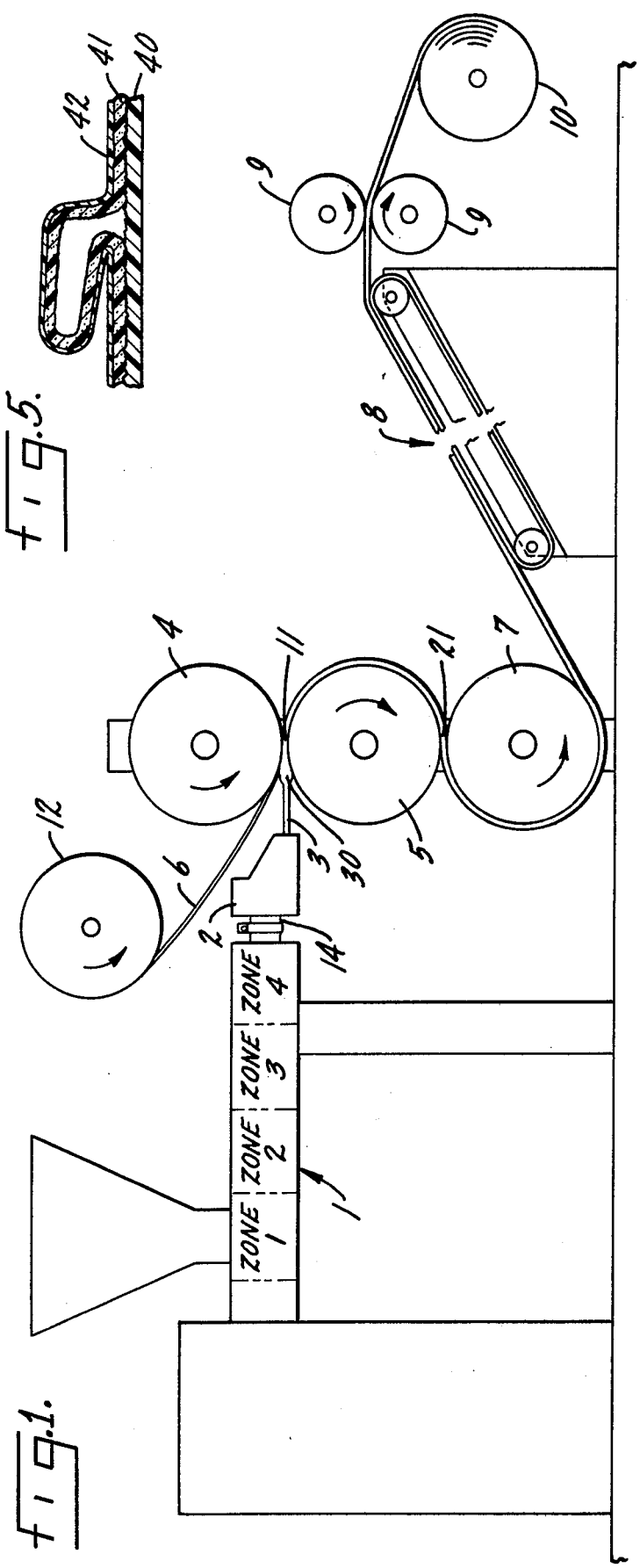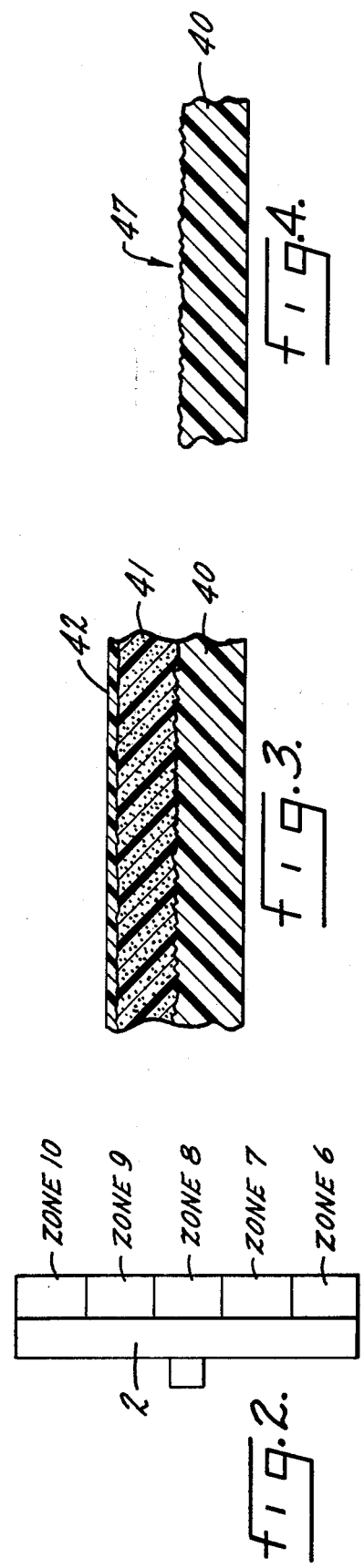

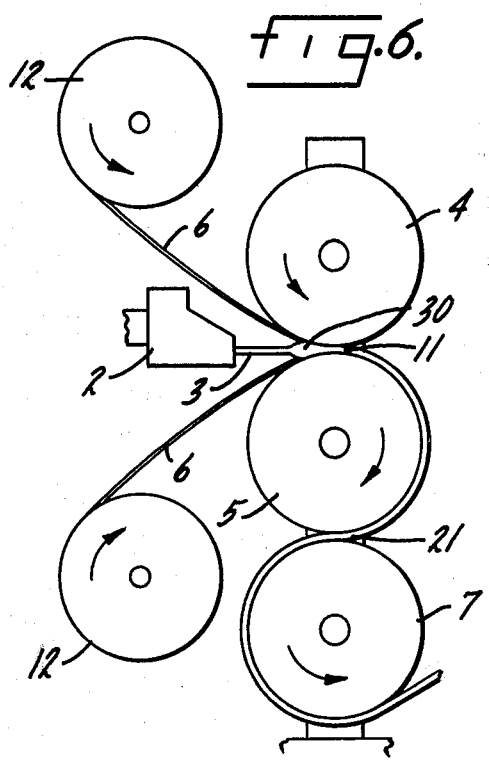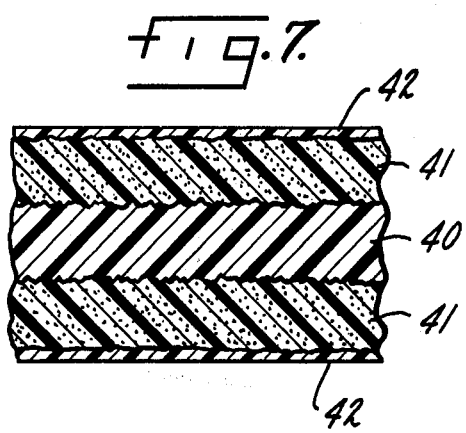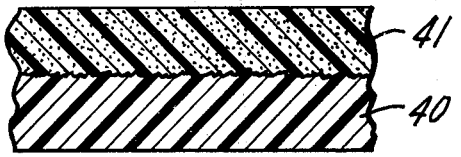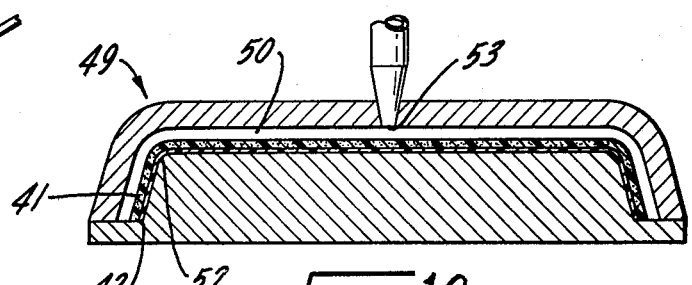

RESIN-FOAM LAMINATE

This is a division of application Ser. No. 544,918, filed Jan. 28, 1975, now abandoned.

BACKGROUND OF THE INVENTION

1. Field of the Invention

The field to which this invention relates is the art of laminating without adhesives resinous polyolefins to elastomeric, open celled polyester urethane foams.

2. Prior Art

Resinous polyethylene and polypropylene are not generally used in forming laminates because they do not readily bond to other materials. In order to form a bond between polyethylene or polypropylene and some other material, it is necessary to treat the surface of the polyethylene or polypropylene so as to make it receptive (sensitive) to either some adhesive or the other material to be laminated thereto.

Examples of the prior art utilizing the sensitization of the surface of polypropylene or polyethylene are the following two patents: W. F. Underwood U.S. Pat. No. 3,023,126 (1962) and D. J. Bridgeford U.S. Pat. No. 3,198,692, (1965). In each of these patents, there is disclosed the method of high voltage stress and corona discharge or chemical oxidation of the surface of polyethylene or polypropylene by means of chromic acid.

The reason polypropylene and polyethylene do not readily bond may be related to several physical properties such as:

1. the general chemical inactivity of these materials;
2. the inability to form a homogenous solution phase in a melt comprising both the thermoplastic polypropylene or polyethylene and the material to be laminated thereto; and
3. the inability of polypropylene or polyethylene to form a homogenous solvent solution phase with other materials to be laminated thereto.

The inability of polyethylene and polypropylene to undergo the above should be compared to the laminatability of vinyl chloride polymers to urethane polymers. When urethane monomers are foamed in contact with a vinyl polymer film the following things may occur:

1. urethane monomers may chemically attack the vinyl,
2. a solution phase either in a melt or in a solution is capable of being formed between the vinyl polymer and the urethane polymer.

It is desirable to have a thermoformable product with the surface properties of vinyl polymers. Vinyl can be readily surface decorated by means of embossing, and can be coated and treated in many ways which are not available to polyethylene or polypropylene.

A potential application for this invention is the use of our laminate (to be discussed hereinafter) as a headliner for automobiles. The presently used headliner comprises a polyester urethane foam with a soft plasticized vinyl skin. The problems with this material are the following:

1. It is too flexible to be thermoformed.
2. Because of the flexibility of the material a metal frame is necessary to support it. In order to incorporate a metal frame into the vinyl-urethane composite, a sewn edge of loops must be made through which metal supports may pass. Said metal supports are then bolted in place to the body of the car.
3. Because of the need for a support frame, there is a great deal of manual labor and handling, which significantly and adversely affect the cost of using these materials.

The purposes served by polyurethane foam supported by a soft vinyl plasticized skin are three-fold; soundproofing, thermal insulation, and decoration.

It is therefore an object of this invention to produce a thermoformable material which is insulative and provides soundproofing.

Another object of this invention is to provide a resinous olefin polymer as a substrate with a decoratable surface, as is present in a plasticized vinyl skin.

It is an object of this invention to produce a laminated or composite structure which is thermoformable to some degree.

Other objects will become clear to those skilled in the art based upon a more detailed exposition of this invention and are properly within the scope of this invention.

BRIEF DESCRIPTION OF THE INVENTION

Broadly, this invention entails the formation of a bond between a resinous polyethylene, polypropylene, copolymers of propylene and ethylene, polystyrene or impact (rubber modified) polystyrene and either a fibrous material such as jute, burlap, and fiber-glass or an open celled foam such as polyurethane. The polyethylene and copolymers of ethylene and propylene have a melt index in the range 0.25–25 g/10 min., the polypropylene has a flow rate in the range 0.5–25 g/10 min. and the polystyrene and impact (rubber modified) polystyrene has a flow rate in the range 2–30 g/10 min. The advantage of this invention over the prior art generally arises from the fact that no special treatment of the surface of the polyethylene or polypropylene is required in order to attain bonding. Further, there is no need for an adhesive between the resinous olefin polymers and the material to which a bond is made.

Once a bond has been formed between the resinous olefin polymer substrate and an open cellular foam, then the bonding properties of said open cellular foam to other materials afford the possibility of laminating a variety of additional materials by means of said foam. The term "substrate" is herein reserved for the resinous olefin polymer in the composite laminate. An example of material that could be readily bonded to an open cellular foam such as polyurethane is polyvinyl. It is readily known in the art how to form a lamination between polyurethane and polyvinyl due to the chemical and physical properties of each.

The nature of the bonding of this invention between the elastomeric, open celled polyester urethane and the resinous olefin polymer substrate appears to be purely physical in nature. That there is a purely physical bond is determined from the observation that upon heating the composite laminate above the softening temperature of the polypropylene or polyethylene or whatever resinous olefin polymer is used as the substrate, there will be a delamination if the slightest stress is put on the interface. Examination of the material making up the lamination reveals that the urethane foam appears uneffected and the surface of the resinous olefin polymer substrate is rippled or coarse in texture but otherwise uneffected. If a delamination is caused only by forced peeling back the polyurethane foam from the polyethylene substrate, there is left behind in the surface of the olefin polymer substrate what hereinafter will be referred to as tendrils of the open cellular structure of the polyurethane foam.

We have discovered that it is possible to attain bonding between the open cellular structure of the polyurethane by forcing molten resinous olefin polymers to flow and fuse around the tendrils at the surface of the open celled polyurethane foam. dr FIG. 1 is a schematic view of a machine to carry out the lamination between a resinous olefin polymer and an open celled foam.

FIG. 2 is a top plan view of the die at the end of the extruder of FIG. 1.

FIG. 3 is a cross-sectional side elevation view of a foam with plasticized vinyl skin laminated to a resinous olefin polymer.

FIG. 4 is a cross-sectional side elevation view of only the resinous olefin substrate of FIG. 3.

FIG. 5 is a cross-sectional view of a "wrinkle".

FIG. 6 is a portion of the machine of FIG. 1 permitting simultaneous lamination from above or below the plane of molten extruded resinous olefin polymer when utilizing two double layer laminate feeds.

FIG. 7 is a cross-sectional side elevational view of the product made by the machine of FIG. 6.

FIG. 8 is a portion of the machine of FIG. 1 permitting simultaneous lamination from above or below the plane of molten extruded resinous olefin polymer when utilizing a single layer laminate feed of an open celled foam.

FIG. 9 is a cross-sectional side elevation view of the product made by the machine of FIG. 8.

FIG. 10 is a cross-sectional view of an injection mold within which is an open celled foam with a plasticized vinyl skin. The vinyl skin is adjacent to a mold's surface opposite which is a gate through which molten resinous olefin polymer may be injected.

DETAILED DESCRIPTION OF THE INVENTION

FIG. 1 discloses a schematic view of a machine for carrying out the laminating process between a resinous olefin polymer and an open celled foam. From extruder 1, molten thermoplastic olefin resin is forced through adaptor 14 and die 2 directly into the nip 11 created between chill rolls 4 and 5. Also into this nip area 11 created between chill rolls 4 and 5 laminate 6 may be fed from the top and/or bottom as shown in FIGS. 6 and 8. Chill rolls herein means the same thing as temperature controllable rollers.

As molten olefin polymer substrate 3 passes between chill rolls 4 and 5, it solidifies. The solidification of the olefin polymer substrate results in the entrapping and holding in fixed position tendrils (hereinabove described) of the open cellular polyurethane foam. The total laminate continues around chill roll 5, through a second nip 21 between chill roll 5 and chill roll 7, around chill roll 7 and over cooling conveyor 8 to pull rolls 9 which maintain the proper tension on the finished laminate. After pull rolls 9, the material may be cut immediately into various sections or wound on a take-up roll 10 depending upon the flexibility of the resultant finished laminate and intended use.

If a polyurethane foam to which there is a flexible vinyl skin is to be laminated to a resinous olefin polmyer substrate by means of the machine disclosed in FIG. 1, several operating features must be carefully controlled.

Many of these processing variables are known to the art of extruding olefin polymers; for example, temperature control over the various zones of the extruder and proper selection of the screw. These well-known processing variables generally involve the resolution of the problem of "surging".

We have discovered that with respect to forming a laminate between a resinous olefin polymer substrate and a polyurethane foam having a plasticized vinyl skin or not having a plasticized vinyl skin that a "melt pool" 30 must be formed just before the nip 11. By melt pool 30 is meant a generally cylindrical melt of resinous olefin polymer which builds up before the nip 11 when more polymer is extruded than feeds through the nip. A steady state in melt pool size is achieved by either changes in rate of flow through the nip 11 for a fixed rmp of the screw of extruder 1 or changes in rpm of the screw of extruder 1 with fixed rate of flow through the nip 11.

It has been observed that said pool 30 forming before the nip 11 generally has dimensions of ¼ of an inch to 1 inch in diameter of said cylinder measured at the outside edges of the web. It is to be noted that the diameter of this cylinder is not uniform across the web, but varies in some degree with a larger diameter at the outside edges of the web than at the center. Too large a melt pool will create a waste problem of molten olefin polymer spilling over the outside edges of the material to which a laminate is being made. Too small a melt pool does not afford sufficient flow about the tendrils of the open celled polyurethane foam so as to create a bond.

The tension on the material being fed into nip 11 from feed rolls 12 must be controlled so that the material forms an angle into the nip of approximately 45° as measured between the molten or extruded resinous olefin polymer web and the web from feed roll 12. If there is too much tension upon the material fed from the top hereinafter referred to as web laminate, then at the outside edges, there will appear wrinkles (see FIG. 5). It is believed that these wrinkles arise from the no-slip characteristics of plasticized vinyl in contact with the polished metal surface of the chill roll 4. If, on the other hand, there is too little tension upon the web laminate fed from the top then a v-shaped wrinkle will appear in the center of the resulting laminated sheet. This v-shaped wrinkle in the center of the sheet is believed to be caused by melt distortion of the resulting laminate sheet.

The effect of too much or too little tension on the laminate web fed from the bottom into the nip area is just the reverse of what happens to the feed web from the top. For example, if too much tension is on the feed web as fed from the bottom, then v-shaped wrinkles will appear in the center of the resulting laminate sheet. If too little tension is applied to the feed web from the bottom, then wrinkles will begin to appear at the outside edges.

FIG. 2 is a top plan view of the die of FIG. 1. The zones of heating are numbered 6 through 10 running from the bottom to the top. These numbered zones correspond to thoses given in Tables 1–3.

FIG. 3 is a cross-sectional view of a foam with a plasticized vinyl skin laminated to a resinous olefin polymer substrate. The olefin polymer substrate 40 forms a physical bond with the elastomeric polyester urethane foam 41. The plasticized vinyl skin 42 laminated to the elastomeric polyester urethane foam 41 is fed from a feed roll 12 into the nip 11 between chill rolls 4 and 5 simultaneously with extruded molted resinous polyolefin 3, the resulting laminant is given in FIG. 3.

FIG. 4 is a cross-sectional side elevation view of the resinous olefin polymer substrate 40 of FIG. 3. The surface 47 of the resinous polyolefin substrate 40 shows the unevenness caused by the elastomeric polyester urethane foam 41 observed after the foam is removed without leaving any tendrils in the resinous olefin polymer substrate 40.

FIG. 6 is a portion of the machine of FIG. 1 permitting simultaneous lamination from above and below the plane of molten extruded resinous olefin polymer when utilizing two laminated feeds 6. Feed rolls 12 are sources for each elastomeric, open cell polyester urethane foam with a plasticized vinyl skin 6. Feed foams 6 with vinyl skin are fed into nip 11 simultaneously with molten resinous olefin polymer 3 which resin 3 has been extruded from die 2. Contact is made between laminates 6 and molten polymer 3 just before nip 11 wherein a melt pool 30 of molten resin is maintained. Further contact is achieved between molten polymer 3 and laminates 6 due to the pressure between chill rolls 4 and 5. The resulting product leaves nip 11 and continues in a clockwise direction about chill roll 5 being again compressed in a nip 21 between chill roll 5 and chill roll 7. The product made by the machine of FIG. 6 is shown in a cross-sectional side elevation view of FIG. 7. As is shown in FIG. 7, a five layered structure is shown, the layers being a plasticized vinyl skin 42 laminated to an elastomeric polyurethane foam 41 and said foam 41 is laminated to the resinous olefin polymer 40 along the side opposite said side laminated to vinyl skin 42.

FIG. 8 shows a portion of machine of FIG. 1 for an open celled foam 6' to a resinous olefin polymer 3', wherein the foam 6' is fed from a feed roll 12 into a nip 11 simultaneously with an extruded resinous olefin 3' and wherein said foam 6' is fed from above the plane of said resinous olefin 3'. The product formed by the machine of FIG. 8 is shown in FIG. 9. The two layers making up the resulting laminated structure are a resinous olefin polymer 40 and an open celled foam 41.

FIG. 10 is a cross-sectional view of an injection mold 49 within which is an open celled foam 41 with a plasticized vinyl skin 42 positioned so that the plasticized vinyl skin is against the side 52 of the mold cavity 50 opposite gate 53.

The process for forming a laminated panel by injection molding, as described hereinafter in Example 6 and FIG. 10, between an elastomeric polyester urethane open cell foam and a resinous olefin polymer, such as polyestyrene or polypropylene comprises the following steps. First, a sheet, coating or strip of polyester urethane foam 41 is positioned on male mold surface 52 of injection mold 49. Foam 41 can be either flat or of a preferred configuration so as to match the contour surface of male mold 52. Foam 41 can also have a coating already bonded to a first surface, for example, plasticized vinyl skin 42, which surface would lie adjacent male mold surface 52 when foam 41 is positioned upon it. Second, female mold 54 is movably positioned above male mold surface 52 and when mated, forms mold cavity 50 which is immediately above the second surface (opposite to the first surface) of foam 41. This second surface of foam 41 will be contacted with resinous olefin polymer 40 to form a resulting product. When female mold 54 is mated to male mold 52, molten resinous olefin polymer 40 is injected through gate 53 and flows into mold cavity 50. Molten polymer 40 should be injected at a temperature which is lower than the melting point temperature of foam 41 in order to assure that a proper bond is formed. Third, molten polymer 40 is allowed to cool, thereby forming a physical bond to the second surface of foam 41. After a brief period of time female mold 54 is withdrawn and the resulting product is removed. This resulting product can be either a two layered structure of foam 41 and polymer 40 or a three layered structure of plasticized vinyl skin 42, foam 41 and polymer 40 depending upon whether the first surface of foam 41 was coated beforehand.

When resinous olefin polymer 40 is polystyrene, it should be injected through gate 53 into mold cavity 50 in a molten state having a temperature of approximately 325°–535° F., preferably around 500° F. For best results the polystyrene should have a flow rate of 2–30 grams/10 minutes, preferably 5–15 grams/10 minutes, and more preferably 8–13 grams/10 minutes, at a specific gravity of about 0.95–1.05, preferably 1.03, and at an injection pressure of about 500–6,000 psi, preferably 3,000 psi.

When resinous olefin polymer 40 is polypropylene, it should be injected through gate 53 into mold cavity 50 in a molten state having a temperature of approximately 400°–555° F., preferably around 500° F. For best results the polypropylene should have a flow rate of 0.5–25 grams/10 minutes, preferably 0.5–13 grams/10 minutes, and more particularly 8 grams/10 minutes, at a specific gravity of about 0.9–95, preferably 0.9–0.92, and at an injection pressure of about 300–9000 psi, preferably 2900 psi.

EXAMPLES 1 & 2

Examples 1 and 2 disclose a laminate of an open celled foam such as polyester urethane coated on one side with a skin of either plasticized vinyl or woven polyurethane fabric, to a resinous olefin polymer such as polypropylene wherein the molten polypropylene is brought into contact with the uncoated side of the polyester urethane foam.

Table 1 gives the process conditions of the National Rubber Machine schematically shown in FIG. 1. The temperature zones have been numbered to correspond to those given in Tables 1–3.

It is to be noted that the open celled foam does not melt at those temperatures wherein the resinous olefin polymer in a molten state is brought into contact with said foam. It is the ability of the molten olefin polymer to flow around the tendrils (as hereinabove defined) in order to foam a physical bond that is crucial. If the tendrils were to melt, then no stable bond would form. It should be recalled that it was the inability of resinous olefins polymers to form solution melt phases with materials other than other resinous olefin polymers that prevented bonding through melt fusion.

Similar results are obtained if resinous polyethylene, copolymers of ethylene-propylene, polystyrene and impact polystyrene are substituted for the polypropylene resin.

All specific gravities herein are determined at 23° C. according to ASTM D-792-66.

All melt indexes and flow rates herein are determined according to ASTM D-1238-70 condition L.

TABLE 1

| Laminating Runs - 1. | Elastomeric polyester urethane foam coated with a plasticized vinyl skin of approximately 80 mil. |
| --- | --- |
| Laminating Runs - 2. | Elastomeric polyester urethane foam backed with a woven polyurethane fabric of approximately 80 mil. |

Process Conditions

| | Barrel Heats | *3 Melt Temp. - 495° F. | | |
| --- | --- | --- | --- | --- |
| *1 Resin-Polypropylene | Zone #1 440° F. | *4 Barrel Pressure - approximately 300 psi. | | |
| *2 Screw #2197 | Zone #2 480° F. | Screw Rpm. - 70 | | |
| Screenpack - 20-40-60 Mesh | Zone #3 480° F. | Extruder Amps. - 26 | | |
| Die Opening - 60 Mil. | Zone #4 510° F. | 3 stack chill roll temp. | *5 Pressure | *5 Gap |
| | Adaptor 500° F. | #4 185° F. | 120 psi | 78 Mil |
| | Die Temps. | #5 200° F. | — | — |
| | Zone #6 405° F. | #7 215° F. | 120 psi | 80 Mil |
| | Zone #7 490° F. | | | |
| | Zone #8 505° F. | Line Speed - | | |
| | Zone #9 490° F. | 1 to 3 ft./min. | | |
| | Zone #10 400° F. | | | |

*1 Resin - polypropylene, specific gravity 1.24 [ASTM D-792-66 (at 23° C.)], flow rate 4g/10 min. [ASTM D-1238-70 condition L], 40% talc filled
*2 Screw #2197 is a standard metering screw with a 4.75/1 compression ratio.
*3 Melt temperature is the temperature of the molten resin as it leaves the die.
*4 Barrel pressure is the pressure exerted by the molten resin on the extruder barrel.
*5 Pressure and corresponding gap are between chill rolls 4 and 5, and chill rolls 5 and 7, respectively.

EXAMPLES 3 & 4

Further examples are given in Tables 2 and 3.

The bond formation between the polypropylene and the polyester urethane foam was found to be strong enough to permit thermoforming of the laminate to a depth of approximately 1½ inches without delamination of the polyester urethane form the resinous polyolefin polymer.

Table 2 and 3 gives the processing conditions for a lamination between polypropylene and uncoated polyester urethane foam.

Similar results are obtained if resinous polyethylene and copolymers of propylene and ethylene are substituted for the polypropylene.

TABLE 2

Lamination run with a polyester urethane open celled foam of 50 mil thickness coated on one side with a plasticized vinyl skin

Process Conditions

| | Barrel Heats | *3 Melt Temp. - 487° F. | | |
| --- | --- | --- | --- | --- |
| *1 Resin - Polypropylene | Zone #1 430° F. | *4 Barrel Pressure - 100 psig. | | |
| *2 Screw #2197 | Zone #2 480° F. | Screw Rpm. - 65 | | |
| Screenpack - 20-40-60 Mesh | Zone #3 480° F. | Extruder Amps. - 23 | | |
| Die Opening - 60 Mil. | Zone #4 515° F. | 3 stack chill roll temp. | *5 Pressure | *5 Gap |
| | Adaptor 505° F. | #4 190° F. | 120 psig | 47 Mil |
| | Die Temps. | #5 205° F. | — | — |
| | Zone #6 485° F. | #7 200° F. | 120 psig | 49 Mil |
| | Zone #7 500° F. | Line Speed - 1¾ ft./min. | | |
| | Zone #8 515° F. | | | |
| | Zone #9 495° F. | | | |
| | Zone #10 480° F. | | | |

*1 Resin - polypropylene, specific gravity 1.24 [ASTM D-792-66 (at 23° C.)], flow rate 4g/10 min. [ASTM D-1238-70 condition L] 40% talc filled
*2 Screw #2197 is a standard metering screw with a 4.75/1 compression ratio.
*3 Melt temperature is the temperature of the molten resin as it leaves the die.
*4 Barrel pressure is the pressure exerted by the molten resin on the extruder barrel.
*5 Pressure and corresponding gap are between chill rolls 4 and 5, and chill rolls 5 and 7, respectively.

TABLE 3

Laminate of Open celled Elastomeric Polyester Urethane Foam of 7/16 thickness to Polypropylene

Process Conditions

| | Barrel Heats | *3 Melt Temp. - 490° F. | | |
| --- | --- | --- | --- | --- |
| *1 Resin - Polypropylene | Zone #1 430° F. | *4 Barrel Pressure - less than 500 psi. | | |
| *2 Screw #2197 | Zone #2 480° F. | Screw Rpm. - 65 | | |
| Screenpack - 20-40 Mesh | Zone #3 490° F. | Extruder Amps. - 26 | | |
| Die Opening - 60 Mil. | Zone #4 515° F. | 3 stack chill roll temp. | *5 Pressure | *5 Gap |
| | Adaptor 500° F. | #4 180° F. | 80 psi | 47 Mil |
| | Die Temps. | #5 210° F. | — | — |
| | Zone #6 490° F. | #7 230° F. | 80 psi | 53 Mil |
| | Zone #7 500° F. | | | |
| | Zone #8 510° F. | Line Speed - 1 to 3 ft./min. | | |
| | Zone #9 500° F. | | | |

TABLE 3-continued

Laminate of Open celled Elastomeric Polyester Urethane Foam of 7/16 thickness to Polypropylene Process Conditions Zone #10 490° F.

*1 Resin- polypropylene, specific gravity 1.24 [ASTM D-792-66 (at 23° C.)], flow rate 4g/10 min. [ASTM D-1238-70 condition L] 40% talc filled
*2 Screw #2197 is a standard metering screw with a 4.75/1 compression ratio.
*3 Melt temperature is the temperature of the molten resin as it leaves the die.
*4 Barrel pressure is the pressure exerted by the molten resin on the extruder barrel.
*5 Pressure and corresponding gap are between chill rolls 4 and 5, and chill rolls 5 and 7, respectively.

EXAMPLE 5

The utility of a composite laminate comprising a polypropylene substrate of 50 mil gauge (for resin see Table 1) and a polyester urethane foam is given in Table 4.

The results of Table 4 were obtained for Riverbank Acoustical Laboratories of IIT. The test method used by them conforms explicitly with the requirements of the American Society for Testing and Materials Method of Test for Sound Absorption of Acoustical Material in Reverberation Rooms, ASTM designation: C423-66.

Ninety percent confidence limits for measured coefficients are less than 0.03 at 125 Hz and less than 0.015 at higher frequencies. No adjustments were made in coefficient values. The noise reduction coefficient (NRC) is the average of the coefficients at 250, 500, 1000, and 2000 Hz, expressed to the nearest integral multiple of 0.05, or to 0.95, whichever is the lower.

TABLE 4

| Absorption Coefficients | SOUND PROOFING EFFICIENCY | | | | | | |
|---|---|---|---|---|---|---|---|
| | ⅓ Octave Band Center Frequency, Hz | | | | | | |
| | 125 | 250 | 500 | 1000 | 2000 | 4000 | NRC |
| ¼ inch urethane | .03 | .03 | .08 | .20 | .37 | .55 | .15 |
| ½ inch urethane | .03 | .08 | .22 | .56 | .76 | .89 | .40 |

EXAMPLE 6

The forming a laminate panel 3 feet by 1 foot between polystyrene and polyester urethane in an injection molding process is shown in this example when the condition of Table 5 are fulfilled. See FIG. 10.

TABLE 5

Injection Molding Process to Form a Bond Between Polystyrene or Polypropylene and An Elastomeric Polyester Urethane Open Celled Foam With a Plasticized Viny Skin Process Conditions

| | |
|---|---|
| Polyester Urethane Foam: Reeves Brothers: | Xuron Polyester Urethane Foam |
| Polystyrene: flow rate 8-13 g/10 min. specific gravity: 1.03 | |
| Temperature of injected polystyrene: 500° F. | |
| Pressure of injected polystyrene: 3,000 psi | |
| Polypropylene: flow rate: 8g/10 min. specific gravity: .9-.92 | |
| Temperature of injected polypropylene 525° F. | |

TABLE 5-continued

Injection Molding Process to Form a Bond Between Polystyrene or Polypropylene and An Elastomeric Polyester Urethane Open Celled Foam With a Plasticized Viny Skin Process Conditions Pressure of injected polypropylene 2,900 psi In summary, the invention discloses a method, and an article of manufacture wherein a bond has been formed between a resinous olefin polymer and an open celled foam such as elastomeric polyester urethane. It has been demonstrated that a physical bond can be formed under the conditions of injection molding or melt extrusion. Variations on the specific examples herein, within the knowledge of one skilled in the relevant art, should be considered within the scope of this invention.

The invention which is claimed is:

1. A process of injection molding for forming a web laminate comprising a resinous olefin polymer substrate and an elastomeric open celled polyester urethane foam web, said process comprising:
   (a) Placing a first surface of said foam against a portion of a surface of an injection mold cavity;
   (b) injecting against a second surface of said foam a molten resinous olefin polymer at a lower temperature than the melting point temperature of said foam into said mold cavity; and
   (c) allowing the resultant web laminate to cool.

2. The process of claim 1, wherein the resinous olefin polymer is selected from the group consisting of: polyethylene and copolymers of ethylene and propylene having a melt index in the range 0.25-25 grams/10 min.; polypropylene and copolymers of propylene and ethylene having a flow rate in the range 0.5-25 grams/10 min.; and, polystyrene and impact polystyrene or rubber modified polystyrene having a flow rate in the range 2-30 grams/10 min.

3. The process of claim 1 wherein said resinous olefin polymer is polystyrene having a flow rate in the range of 5-15 grams/10 minutes and a specific gravity in the range of 0.95-1.05; and the temperature and pressure at which said polystyrene is injected are in the ranges of 325°-535° F., and 500-600 psi., respectively.

4. The process of claim 1 wherein said resinous olefin polymer is polypropylene having a flow rate in the range of 0.5-13 grams/10 minutes and a specific gravity in the range of 0.9-0.95; and the temperature and pressure at which said polypropylene is injected are in the ranges of 400°-550° F., and 300-9000 psi., respectively.

5. The process of claim 1, wherein said open celled foam has a coating on a first side, and wherein said foam is positioned within the injection mold cavity so that a second surface of said foam will be contacted with the injected resinous olefin polymer.

* * * * *

UNITED STATES PATENT OFFICE
CERTIFICATE OF CORRECTION

Patent No. 4,263,247　　　　　　　Dated April 21, 1981

Inventor(s) Joseph C. Berger, James E. Fitzpatrick, James P. Whelan

It is certified that error appears in the above-identified patent and that said Letters Patent are hereby corrected as shown below:

Patent Reads:

| Col. | Line | |
|---|---|---|
| 3 | 7 | "dr" should be deleted. |
| 3 | 23 | "elevational" should be --elevation-- |
| 4 | 49 | "web from" should be --web when fed from-- |
| 4 | 53 | "web from" should be --web fed from-- |
| 4 | 67 | "molted" should be --molten-- |
| 5 | 51 | "polyestyrene" should be --polystyrene-- |
| 5 | 56 | "preferred" should be --preformed-- |
| 6 | 32 | "particularly" should be --preferably-- |
| 6 | 33 | "0.9-95" should be --0.9-0.95-- |
| 6 | 46 | "THe" should be --The-- |
| 6 | 55 | "foam" should be --form-- |
| 9 | 28 | "for" should be --by-- |
| 9 | 55 | "condition" should be --conditions-- |
| 9 | 59 | "Viny" should be --Vinyl-- |
| 9 | 61 | "Xuron" should be --Curon-- |

Signed and Sealed this

Fifteenth Day of September 1981

|SEAL|

Attest:

GERALD J. MOSSINGHOFF

Attesting Officer　　Commissioner of Patents and Trademarks